United States Patent
Masuda et al.

(10) Patent No.: US 7,054,735 B2
(45) Date of Patent: May 30, 2006

(54) APPARATUS AND METHOD FOR CONTROLLING INTERNAL COMBUSTION ENGINE

(75) Inventors: Satoshi Masuda, Kariya (JP); Masaomi Inoue, Kariya (JP); Yuichi Takemura, Anjo (JP); Kenji Kasashima, Aichi-ken (JP); Rihito Kaneko, Aichi-ken (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 11/106,568

(22) Filed: Apr. 15, 2005

(65) Prior Publication Data

US 2005/0234632 A1    Oct. 20, 2005

(30) Foreign Application Priority Data

Apr. 15, 2004    (JP)    ............... 2004-119850

(51) Int. Cl.
  *G01L 23/22*    (2006.01)
  *F02D 45/00*    (2006.01)

(52) U.S. Cl. ..................................... 701/111
(58) Field of Classification Search ............. 701/111, 701/110, 114
See application file for complete search history.

(56) References Cited

U.S. PATENT DOCUMENTS 4,991,553 A  *  2/1991  Kurihara et al. ............ 701/111

FOREIGN PATENT DOCUMENTS

JP    6-60621       12/1985
JP    7-180599 A  *  7/1995

* cited by examiner

*Primary Examiner*—Hieu T. Vo
(74) *Attorney, Agent, or Firm*—Kenyon & Kenyon LLP (57) ABSTRACT

An ECU obtains two data values (a peak value and a waveform correlation coefficient) that show the characteristics of a knock from the output of a knock sensor. The ECO approximately obtains the mean of each data value by smoothing each data value, and approximately obtains a variance by smoothing the squared deviation between the data values before and after the smoothing process. The ECU then computes the square root of the variance to approximately obtain a standard deviation. The ECU normalizes each data value using the mean and the standard deviation, obtains a distribution of the normalized two data values, and calculates a correlation coefficient that shows the correlation between the obtained distribution and an ideal knock distribution. Based on the correlation coefficient, the ECU corrects a knock determination threshold value. Therefore, the mean and the standard deviation of the data values are computed with a small RAM capacity.

8 Claims, 6 Drawing Sheets

Waveform Correlation Coefficient c [θ] before Peak

Fig. 7

Waveform Correlation Coefficient c [θ] after Peak

APPARATUS AND METHOD FOR CONTROLLING INTERNAL COMBUSTION ENGINE

BACKGROUND OF THE INVENTION

The present invention relates to an apparatus and method for controlling an internal combustion engine that statistically process the output of a sensor that detects the operating state of the internal combustion engine, and control the operation of the internal combustion engine using the result obtained by the statistical process.

When controlling the operation of an internal combustion engine, it is often necessary to statistically process the output of a sensor that detects the operating state of the internal combustion engine. For example, in knock determination as disclosed in Japanese Examined Patent Publication No. 6-60621, the output of a knock sensor is sampled at every ignition to extract a peak value. Knock occurrence is determined by analyzing the distribution profile of a value obtained by logarithmic conversion of the peak value using a statistical method to correct a knock determination threshold value.

In general, a mean and a standard deviation σ are used as indexes for determining the distribution profile of the data values using the statistical method. The standard deviation σ is the square root of a variance V and is widely used as the index representing the degree of spread of the data values. The variance V is the sum of the squared deviations between each data value and the mean divided by the number of the data values.

For example, when the data values the number of which is n are assumed to be X1, X2, . . . Xn, the mean Xav, the variance V, the standard deviation σ are defined as follows.

Mean $Xav=(X1+X2+ \ldots +Xn)/n$

Variance $V=\{(X1-Xav)^2+(X2-Xav)^2+ \ldots +(Xn-Xav)^2\}/n$

Standard deviation $\sigma=\sqrt{V}$

When computing the mean Xav and the standard deviation σ using the definitional equations, a huge RAM capacity is required to store a large amount of data values obtained during a predetermined period. As an engine control, in a system that requires updating various types of information at every ignition or fuel injection in each cylinder, the RAM capacity that can be used for computation of the mean Xav and the standard deviation σ is limited. Therefore, in reality, it is difficult to simply execute the computation method that uses the definitional equations.

When the operating condition of the engine is changed, the output of the knock sensor and its peak value are also changed. Therefore, if the engine operating condition is changed while the data values of the peak value is being stored in the RAM, the mean Xav and the standard deviation σ including different engine operating conditions are undesirably computed, resulting in deterioration of the accuracy of the mean Xav and the standard deviation σ. That is, in the computation method that uses the definitional equations, the trackability of the mean Xav and standard deviation σ in a transient state is insufficient.

Therefore, in the above publication No. 6-60621, when determining the distribution profile of the value obtained by logarithmic conversion of the peak value of the output from the knock sensor, instead of computing the mean Xav and the standard deviation σ, the cumulative 10% point, cumulative 50% point, and cumulative 90% point of the distribution are updated at every ignition to determine the knock occurrence in accordance with the ratio of the cumulative 10% point, cumulative 50% point, and cumulative 90% point.

It is possible to approximately compute the mean Xav and the standard deviation σ using the cumulative % point. However, since the characteristic of the knock occurrence appears at the top cumulative percentage point of the distribution (for example the cumulative 97% point), it is necessary to compute the mean Xav and the standard deviation σ using the top cumulative percentage point (for example cumulative 97% point) to reflect the characteristic of the knock occurrence in the computed values of the mean Xav and the standard deviation σ. However, even if the frequency of occurrence of knocks is the same, since the variation range of the degree of knock (the greatness of peak value) is great, the top cumulative percentage point tends to vary greatly. Therefore, when computing the mean Xav and the standard deviation σ using the top cumulative percentage point, variation of the top cumulative percentage point is likely to cause the computed values of the mean Xav and the standard deviation σ to deviate from the true values.

SUMMARY OF THE INVENTION

Accordingly, it is an objective of the present invention is to provide an apparatus and method for controlling an internal combustion engine that, when periodically sampling and statistically processing the output of a sensor that detects the operating state of the internal combustion engine, approximately computes the mean of the data value and an index that represents the degree of spread of the data value with a small RAM capacity, and improves the trackability in a transient state.

To achieve the above objective, the control apparatus for an internal combustion engine provided by the present invention includes a statistical processing section, which periodically samples and statistically processes the output of a sensor that detects the operating state of the internal combustion engine. The control apparatus controls the operation of the internal combustion engine using the processed result of the statistical processing section. The statistical processing section smoothes the sampled data value to approximately obtain the mean of the data value every time the output of the sensor is sampled, and computes an index that represents the degree of spread of data value (hereinafter, referred to as degree-of-spread index) using the squared deviation between the data value before the smoothing process and the data value after the smoothing process.

As in the present invention, using the smoothing process enables sequentially updating the mean and the degree-of-spread index every time the output of the sensor is sampled. Therefore, it is no longer necessary to keep storing a lot of data values in a RAM of a vehicle-mounted computer. Thus, the mean and the degree-of-spread index are approximately computed with a small RAM capacity. Furthermore, since the top cumulative percentage point is not used, the mean and the degree-of-spread index are computed without the influence of the top variation of the distribution. This improves the approximate accuracy of the mean and degree-of-spread index. Furthermore, using the smoothing process improves the trackability in a transient state.

As for the degree-of-spread index, for example, the variance V and the standard deviation σ are considered. According to the above mentioned definitional equations, the mean is a value obtained by arithmetic mean of all the data values, the variance V is a value obtained by arithmetic mean of (data value−mean)$^2$ obtained per each data value, and the standard deviation σ is $\sqrt{V}$.

As the present invention, by applying the method of approximating the mean (the arithmetic mean of the data values) by the smoothed value of the data value to the computation method of the variance V [arithmetic mean of (data value−mean)$^2$], the variance V [arithmetic mean of (data value−mean)$^2$] can be approximated by the smoothed value of (data value−mean)$^2$, In the present invention, since the mean is approximated by the smoothed value of the data value, (data value−mean)$^2$ will be equal to the squared deviation between the data value before the smoothing process and the data value after the smoothing process.

Therefore, the variance V is approximately obtained by smoothing the squared deviation between the data value before the smoothing process and the data value after the smoothing process. Then, the square root of the variance V is computed to approximately obtain the standard deviation σ. In this manner, the mean and the standard deviation σ are easily computed by the smoothing process.

Furthermore, the statistical processing section may include a normalization section that normalizes (equates, makes dimensionless) the sampled data value using the mean and the standard deviation σ. With this structure, even if the operating condition of the engine is changed, the data values obtained before and after the change are corrected to the data values sampled under the standard engine operating condition. Therefore, it is no longer necessary to statistically process the data values per each engine operating condition. This reduces the load of the statistical processing and avoids deterioration of the statistical processing accuracy due to changes of the engine operating condition.

In a case where the present invention is applied to knock determination, a sensor that outputs a signal having a waveform that corresponds to the knock state of the internal combustion engine is used as the sensor. Then, every time the output signal of the sensor is sampled, the peak value of the knock frequency component in the output signal and the waveform correlation coefficient that shows the correlation between the waveform of the output signal and the ideal knock waveform representing the waveform specific to a knock are obtained as the data values. The peak value and the waveform correlation coefficient are normalized by the normalization section. The distribution of the normalized peak value and the waveform correlation coefficient corresponding to a predetermined number of times of ignition is obtained, and the knock occurrence is determined in accordance with whether the distribution profile has the characteristics that appear when knock has occurred In this manner, unlike the distribution of only the peak value of the sensor output as in the above publication No. 6-60621, the distribution that distinguishes noise from a knock is created. Therefore, the problem of deterioration of knock determination accuracy due to noise is solved, thereby improving the accuracy and the reliability of knock determination. Furthermore, since the two data values (the peak value and the waveform correlation coefficient) are normalized and the distribution of the normalized data values are obtained, a universal distribution is created that have no differences due to the operating condition of the engine. Therefore, the distribution need not be created per each engine operating condition. This reduces the processing load of producing a distribution and prevents deterioration of the accuracy of the distribution due to the engine operating condition.

Also, the coefficient of smoothing used for the smoothing process may be changed in accordance with the operating state of the internal combustion engine. In this case, for example, during a normal operation of the engine, a setting that stresses the accuracy of the mean and the standard deviation σ is selected, and when the operating state of the engine is in a transient state, a setting that stresses the trackability is selected. That is, the accuracy and the trackability are adjusted in accordance with the engine operating state.

The present invention further provides a method for controlling an internal combustion engine. The method includes periodically sampling and statistically processing the output of a sensor that detects the operating state of the internal combustion engine, and controlling the operation of the internal combustion engine using the result of the statistical processing. The statistical processing includes: smoothing the sampled data value to approximately obtain the mean of the data value every time the output of the sensor is sampled; and computing an index representing the degree of spread of the data value using the squared deviation between the data value before the smoothing process and the data value after the smoothing process.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A knock determination process according to one embodiment present invention will now be described. At first, the schematic configuration of an entire engine control system will be described with reference to FIG. 1. An internal combustion engine, which is an engine 11 in this embodiment, has an intake pipe 12. At the most upstream section of the intake pipe 12, an air cleaner 13 is provided. An air flow meter 14, which detects the intake air amount, is provided downstream of the air cleaner 13. A throttle valve 15, the opening degree of which is adjusted by a motor 10, and a throttle opening sensor 16, which detects the throttle opening degree, are located downstream of the air flow meter 14.

Figure 1:
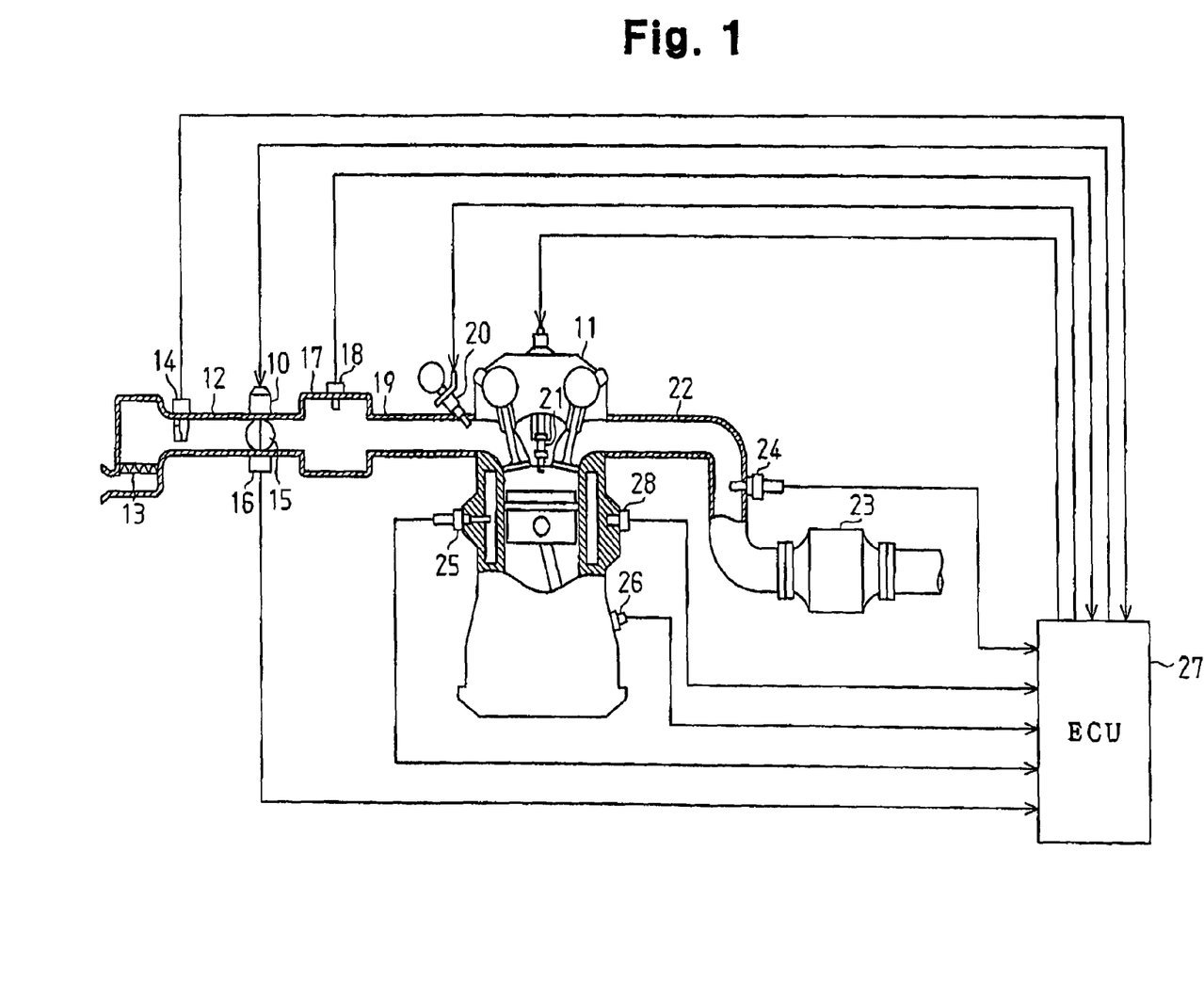
FIG. 1 is a schematic diagram of an entire engine control system according to one embodiment of the present invention.

Furthermore, a surge tank 17, which is connected to the intake pipe 12, is located downstream of the throttle valve

15. An intake pipe pressure sensor 18, which detects the intake pipe pressure, is located in the surge tank 17. An intake manifold 19, which introduces air into cylinders of the engine 11, is connected to the surge tank 17. The intake manifold 19 extends from the surge tank 17 to intake ports of the cylinders while being branched. Fuel injection valves 20, which inject fuel, are attached to the intake manifold 19 to be located in the vicinity of the respective intake ports. Ignition plugs 21 each corresponding to one of the cylinders are attached to the cylinder head of the engine 11. Spark discharge of each ignition plug 21 ignites the air-fuel mixture in the corresponding cylinder.

On the other hand, a catalyst 23 such as a three-way catalyst that removes CO, HC, NOx, or the like from emission gas are provided in an exhaust pipe 22 of the engine 11, and an air-fuel ratio sensor 24, which detects the air-fuel ratio of emission gas, is located upstream of the catalyst 23. A coolant temperature sensor 25, which detects the coolant temperature, a knock sensor 28, which detects the knock vibration, and a crank angle sensor 26, which outputs a pulse signal every time a crankshaft of the engine 11 rotates by a predetermined crank angle, are attached to a cylinder block of the engine 11. Based on the output signal of the crank angle sensor 26, the crank angle and the engine speed are detected.

The output of the various types of sensors are supplied to an engine control unit (hereinafter, referred to as ECU) 27. The ECU 27 is mainly composed of a microcomputer and controls the fuel injection amount of the fuel injection valve 20 and the ignition timing of the ignition plug 21 by executing various types of engine control programs stored in an incorporated ROM (storing media).

Furthermore, the ECU 27 extracts two data values (a peak value and a waveform correlation coefficient) representing the characteristics of a knock from the output of the knock sensor 28 (hereinafter, simply referred to as the sensor output) at every ignition by executing routines for knock determination in FIGS. 2 to 4, which will be described later. The ECU 27 approximately obtains the mean of each data value by smoothing each of the two data values, and approximately obtains the variance V by smoothing the squared deviation between each of the data values before the smoothing process and the data value after the smoothing process. The ECU 27 then approximately obtains the standard deviation a by computing the square root of the variance V. Thereafter, the ECU 27 normalizes (equates, make dimensionless) each data value using the mean and the standard deviation σ, and obtains the distribution of both the normalized data values (the peak value and the waveform correlation coefficient) corresponding to a predetermined number of times of ignition. The ECU 27 further calculates the correlation coefficient (degree of similarity) for knock determination representing the correlation (similarity) between the distribution and an ideal knock distribution as an index representing the knock level (frequency of occurrence of knocks). Based on the calculated correlation coefficient for knock determination, the ECU 27 corrects the knock determination threshold value used in knock determination made at every single combustion. The ECU 27 compares the correlation coefficient for knock determination with the knock determination threshold value at every single combustion and determines the presence or absence of a knock at every single combustion. The ECU 27 performs a knock control in which, the ECU 27 suppresses a knock by retarding the ignition timing when it is determined that a knock is present, and the ECU 27 advances the ignition timing when it is determined that a knock continues to be absent. Accordingly, the ECU 27 improves the engine output and the fuel consumption by advancing the ignition timing within a range of knock noise tolerable to the human ear.

Hereafter, the method of knock determination will be described.

(1) Data Values Extracted from Sensor Output

Data values extracted from sensor output represents the characteristics of a knock. In this embodiment, the peak value of the knock frequency component in the sensor output and the waveform correlation coefficient representing the correlation between the waveform of the sensor output and the ideal knock waveform, which is the waveform specific to a knock, are used as the data values. The waveform correlation coefficient is computed in the following manner. At first, the knock waveform that shows the ideal profile during the period before and after the peak is set as the ideal knock waveform. If the increase rate of the sensor output waveform before the peak is steeper than that of the ideal knock waveform, the ideal knock waveform is simply added up to obtain the waveform area before the peak. On the other hand, if the increase rate of the sensor output waveform before the peak is gentler than that of the ideal knock waveform, the waveform area before the peak is obtained by adding a value obtained by correcting the ideal knock waveform to be decreased by a predetermined amount in accordance with the difference between the sensor output waveform and the ideal knock waveform.

The waveform area after the peak is obtained by adding a value obtained by correcting the ideal knock waveform to be decreased in accordance with the difference between the sensor output waveform after the peak and the ideal knock waveform. In this manner, after the computations of the waveform area before and after the peak are completed, the waveform area before the peak and the waveform area after the peak are summed to obtain the waveform area during a predetermined period from before the peak to after the peak. Then, the waveform area divided by the area of the ideal knock waveform is regarded as the waveform correlation coefficient.

(2) Normalization of Data Values

The mean and the standard deviation σ are necessary to normalize each data value (each of the peak value and the waveform correlation coefficient), and the variance V is necessary to calculate the standard deviation σ.

For example, when the data values the number of which is n are assumed to be X1, X2, . . . Xn, the mean Xav, the variance V, the standard deviation σ are defined as follows.

Mean $Xav=(X1+X2+ \ldots +Xn)/n$

Variance $V=\{(X1-Xav)^2+(X2-Xav)^2+ \ldots +(Xn-Xav)^2\}/n$

Standard deviation $\sigma=\sqrt{V}$

When computing the mean Xav and the standard deviation a using the definitional equations, a huge RAM capacity is required to store a large amount of data values obtained during a predetermined period. As an engine control, in a system that requires updating various types of information at every ignition or fuel injection in each cylinder, the RAM capacity that can be used for computation of the mean Xav and the standard deviation σ is limited. Therefore, it is difficult to simply execute the computation method that uses the definitional equations.

Therefore, in this embodiment, every time a data value is extracted from the sensor output, the data value is smoothed to approximately obtain the mean of the data value, and the squared deviation between the data value before the smoothing process and the data value after the smoothing process is used to approximately obtain the standard deviation σ.

According to the above mentioned definitional equations, the mean is a value obtained by arithmetic mean of all the data values, the variance V is a value obtained by arithmetic mean of (data value−mean)$^2$ obtained per each data value, and the standard deviation σ is $\sqrt{V}$. As the preferred embodiment, by applying the method of approximating the mean (the arithmetic mean of data values) by the smoothed value of the data values to the computation method of the variance V [arithmetic mean of (data value−mean)$^2$], the variance V [arithmetic mean of (data value−mean)$^2$] is approximated by the smoothed value of (data value−mean)$^2$. In this embodiment, since the mean is approximated by the smoothed value of the data value, (data value−mean)$^2$ will be equal to the squared deviation between the data value before the smoothing process and the data value after the smoothing process. Based on this relationship, in this embodiment, the squared deviation between the data value before the smoothing process and the data value after the smoothing process is smoothed to approximately obtain the variance V, and the square root of the variance v is computed to approximately obtain the standard deviation σ.

As described above, every time the mean and the standard deviation σ of each of the peak value and the waveform correlation coefficient are computed using the smoothing process, the peak value and the waveform correlation coefficient are normalized (equated, made dimensionless) by the following equation using the mean and the standard deviation σ.

Normalized peak value Sp=(peak value−mean of peak value)/standard deviation of peak value Normalized waveform correlation coefficient Sc=(waveform correlation coefficient−mean of waveform correlation coefficient)/standard deviation of waveform correlation coefficient According to this normalization, universal data values (the peak value and the waveform correlation coefficient) are obtained that have no differences due to the operating condition of the engine.

(3) Create Detection Distribution

It is determined to which of the regions, which are divided in advance, the normalized data values (Sp, Sc) of each of the peak value and the waveform correlation coefficient correspond, and the counter of the appropriate region is incremented. This process is repeated by a number of times corresponding to a predetermined number of times of ignition to create the detection distribution.

At this time, all the regions in which the detection distribution possibly exists may be subdivided into smaller regions, and a counter may be provided in each region to create the detection distribution. However, in this case, the number of the counters becomes excessive and excessive amount of the RAM of the ECU 27 is used.

Therefore, in this embodiment, few regions in which the characteristics of a knock become significant (hereinafter, referred to as characteristic regions) are extracted from the regions in which the detection distribution possibly exists. Then, a counter is provided in each characteristic region. The distribution of the normalized data values (Sp, Sc) is obtained by incrementing, at every ignition, the counter in the characteristic region to which the normalized data values (Sp, Sc) of the peak value and the waveform correlation coefficient belong. Thus, the normalized data values (Sp, Sc) in only the few characteristic regions in which the characteristics of a knock become significant is counted. This considerably saves the amount of the RAM used. Furthermore, since only the portions in which the characteristics of a knock become significant are selected and extracted, the accuracy and the reliability of knock determination are sufficiently secured.

(4) Correlation Between Detection Distribution and Ideal Knock Distribution (Determination of Knock Level)

The correlation coefficient (degree of similarity) for knock determination that represents the correlation (similarity) between the detection distribution of the normalized data values (Sp, Sc) and the ideal knock distribution is computed. The correlation coefficient for knock determination serves as an index for determining whether the profile of the detection distribution has the characteristics that appear at the occurrence of a knock.

The ideal knock distribution is the distribution of the normalized data values (Sp, Sc) computed in advance using the above mentioned method when a knock exceeding a permissible level is occurring, and is stored in a nonvolatile memory such as the ROM of the ECU 27. The correlation coefficient for knock determination is obtained by dividing the inner product of the pattern of the detection distribution and the pattern of the ideal knock distribution by the product of the norms. The division by the product of the norms causes the absolute value of the correlation coefficient for knock determination to constantly become less than or equal to one (−1≦correlation coefficient for knock determination≦1), and as the correlation between the detection distribution and the ideal knock distribution is increased, the correlation coefficient for knock determination approaches a value close to one. Therefore, the correlation coefficient for knock determination serves as an index representing the knock level (frequency of occurrence of knocks), and as the correlation coefficient for knock determination approaches a value close to one, the knock level is determined to be great (frequency of occurrence of knocks is high).

(5) Correction of Knock Determination Threshold Value

The correlation coefficient for knock determination is compared with a predetermined knock determination threshold value. If the correlation coefficient for knock determination is greater than or equal to the knock determination threshold value, it is determined that a knock exceeding the permissible level is occurring. Thus, a knock determination threshold value used for knock determination at every single combustion is corrected to be decreased. Therefore, small knocks are detected.

Contrarily, if the correlation coefficient for knock determination is smaller than the knock determination threshold value, the knock level is determined to be below the permissible level. In this case, there is a possibility that the ignition timing is retarded more than necessary by the knock control, thereby decreasing the engine torque. Therefore, the knock determination threshold value is corrected to be increased to detect only greater knocks. When the correlation coefficient for knock determination is within a predetermined range corresponding to an appropriate knock state, the knock determination threshold value need not be corrected.

According to such a process, the knock determination threshold value is automatically corrected in accordance with the production variation of the engine and changes of the vibration level with time. Therefore, high precision knock determination is performed always using the appropriate knock determination threshold value. In addition, a design and development engineer need not to closely consider the influence of the production variation of the engine and deterioration with time when adapting the knock determination threshold value to the engine. This simplifies a process for adapting the knock determination threshold value to the engine.

Figure 2:
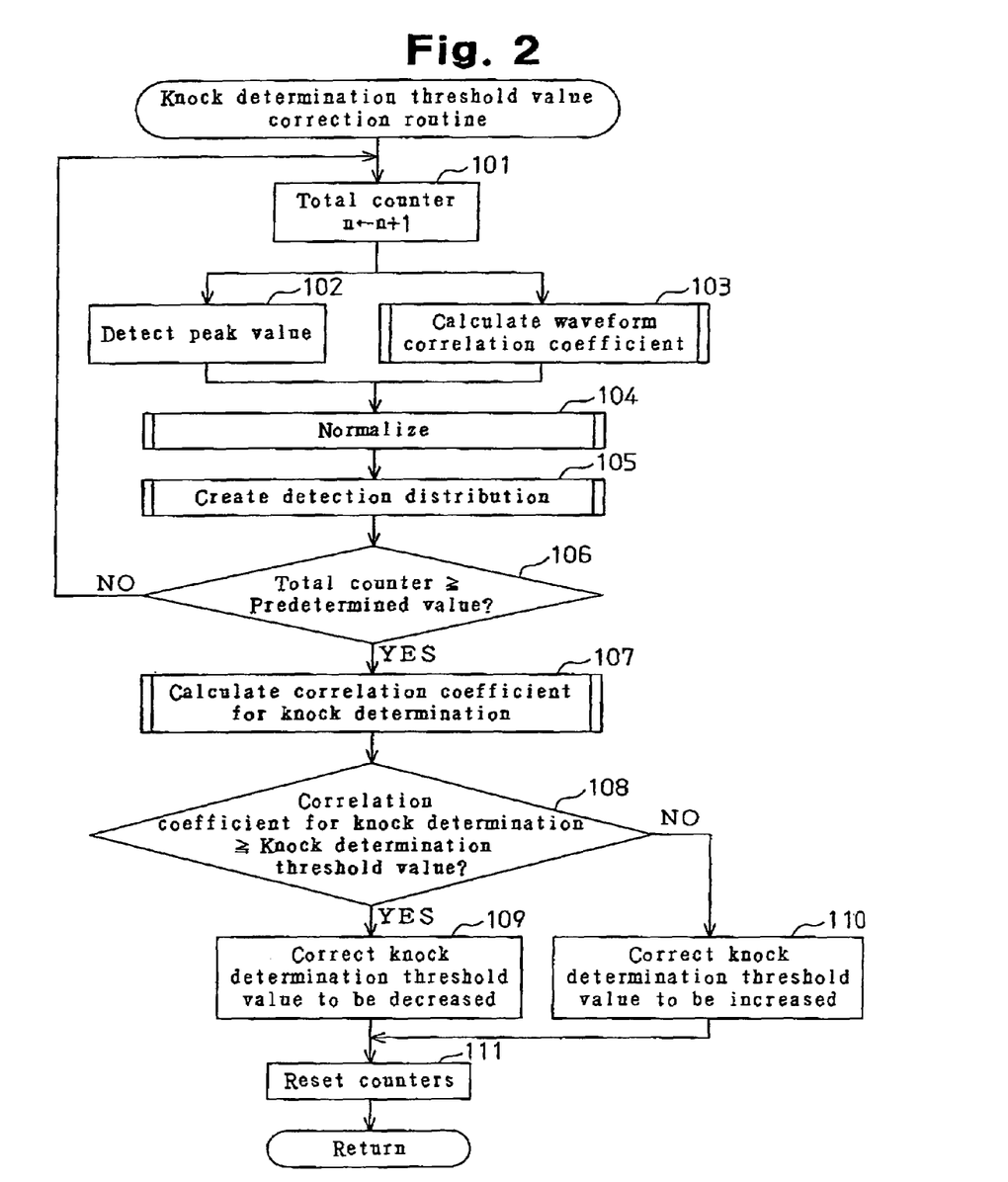
FIG. 2 is a flowchart showing a process of a knock determination threshold value correction routine.
Figure 3:
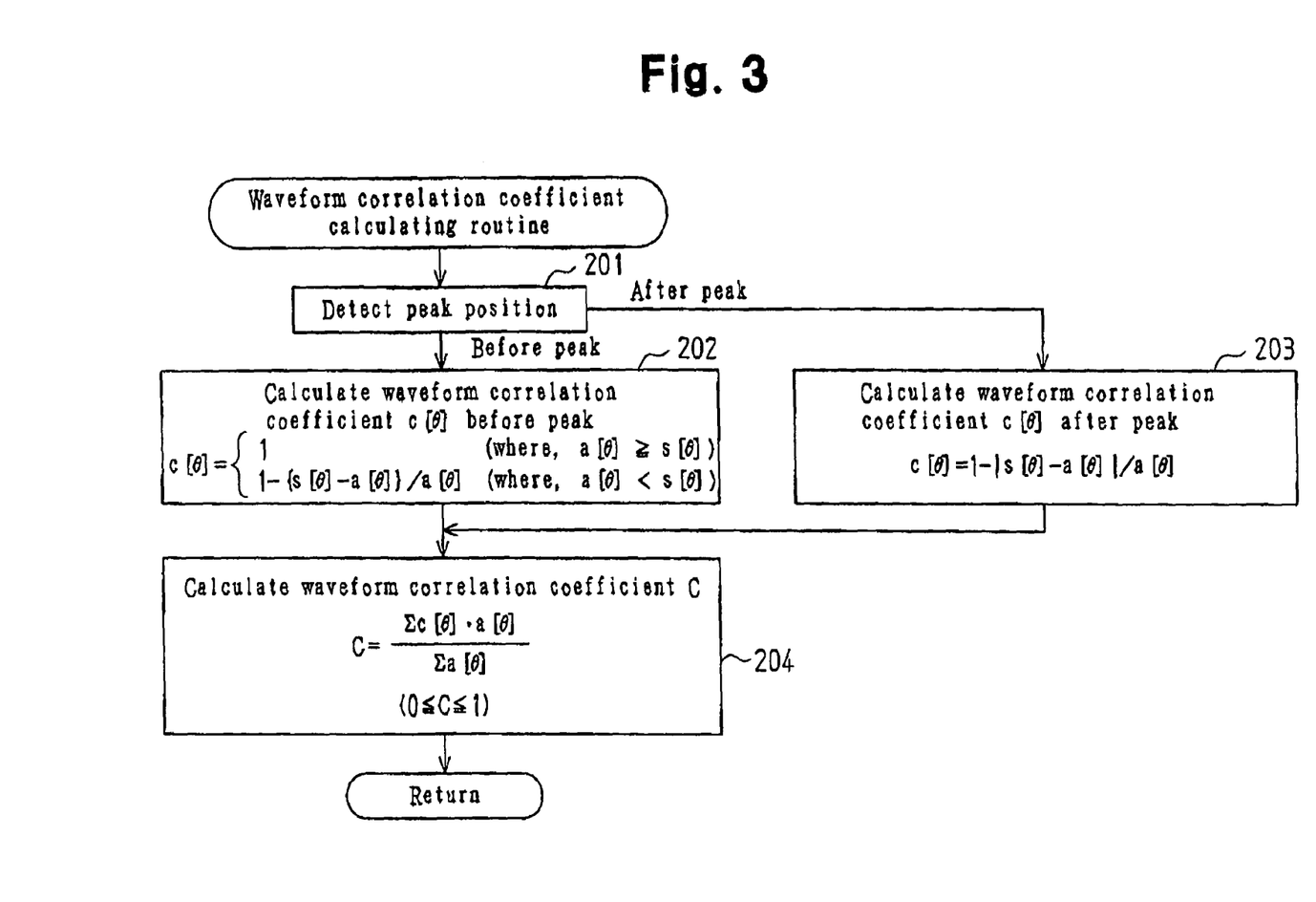
FIG. 3 is a flowchart showing a process of a waveform correlation coefficient calculating routine.
Figure 4:
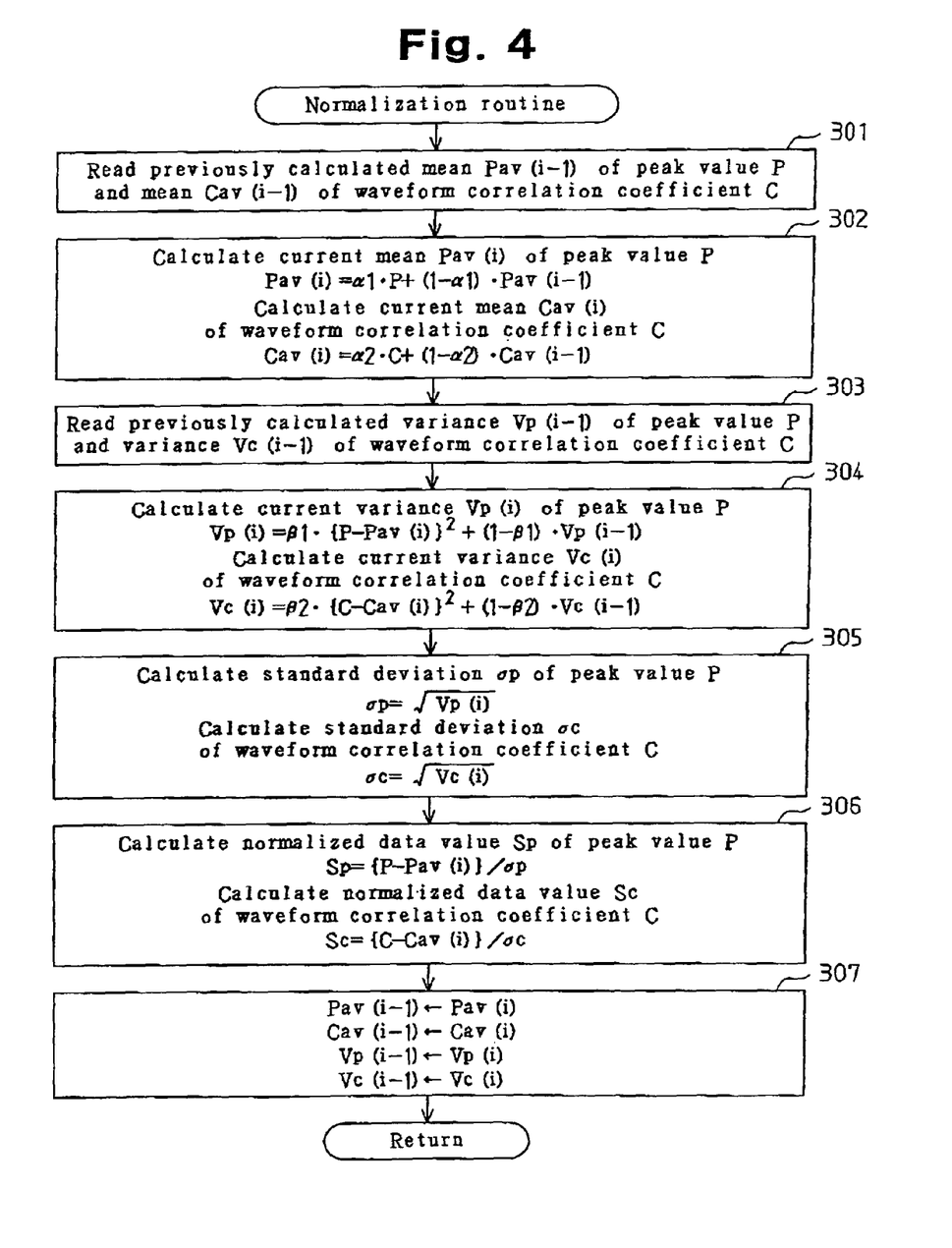
FIG. 4 is a flowchart showing a process of a normalization routine.

The above mentioned correction of the knock determination threshold value is executed by the ECU 27 in accordance with the routines of FIGS. 2 to 4. The processes of each routine will now be described.

[Knock Determination Threshold Value Correction Routine]

The knock determination threshold value correction routine shown in FIG. 2 is executed periodically while the engine is running. When the routine is started, at step S101, the ECU 27 increments a total counter that counts the number of samples of the data values (the peak value P and the waveform correlation coefficient C) extracted from the sensor output. Subsequently, at step S102, the ECU 27 detects the peak value P of the knock frequency component in the sensor output at every ignition. Then, at step S103, the ECU 27 executes the waveform correlation coefficient calculating routine of FIG. 3 described later to calculate the waveform correlation coefficient C.

Thereafter, the ECU 27 proceeds to step S104, and executes the normalization routine of FIG. 4 described later. That is, the ECU 27 computes the mean and the standard deviation σ of each of the peak value P and the waveform correlation coefficient C using the smoothing process, and normalizes (equates, make dimensionless) the extracted data values using the mean and the standard deviation σ. Thereafter, the ECU 27 proceeds to step S105 and executes the detection distribution creating routine (not shown) to create the detection distribution as described below. In this embodiment, few regions in which the characteristics of a knock become significant (characteristic regions) are extracted from the regions in which the detection distribution possibly exists. Then, a counter is provided in each characteristic region. The ECU 27 determines whether the normalized data values (Sp, Sc) of the peak value P and the waveform correlation coefficient C correspond to any of the characteristic regions. If there is a corresponding characteristic region, the ECU 27 increments the counter of the appropriate characteristic region, and if there is no corresponding characteristic region, the ECU 27 does not increment the counter of the characteristic region.

Thereafter, the ECU 27 proceeds to step S106, and determines whether the value of the total counter has reached a predetermined value. If the value of the total counter has not reached the predetermined value, the ECU 27 repeats the process of steps S101 to S105. Therefore, until the number of samples of the peak value P and the waveform correlation coefficient C respectively reach the predetermined values, the ECU 27 repeats sampling of the peak value P and the waveform correlation coefficient C, normalization of the data values, and creating the detection distribution.

When the value of the total counter has reached the predetermined value, the ECU 27 proceeds to step S107, and executes the correlation coefficient for knock determination calculating routine (not shown) to calculate the correlation coefficient for knock determination representing the correlation between the detection distribution based on the normalized data values (Sp, Sc) and the ideal knock distribution. The correlation coefficient for knock determination is obtained by dividing the inner product of the pattern of the detection distribution based on the normalized data values (Sp, Sc) and the pattern of the ideal knock distribution by the product of the norms.

Thereafter, the ECU 27 proceeds to step S108, and compares the correlation coefficient for knock determination with the predetermined knock determination threshold value. If the correlation coefficient is greater than the knock determination threshold value, the ECU 27 determines that a knock exceeding the permissible level is occurring and proceeds to step S109. At step S109, the ECU 27 corrects the knock determination threshold value used for knock determination at every single combustion to be decreased. Therefore, small knocks are detected.

Contrarily, if the correlation coefficient for knock determination is smaller than the knock determination threshold value, the ECU 27 determines that the knock level is below the permissible level. In this case, there is a possibility that the ignition timing is retarded more than necessary by the knock control, thereby decreasing the engine torque. Therefore, the ECU 27 proceeds to step S110, and corrects the knock determination threshold value to be increased so that only greater knocks are detected. Thereafter, the ECU 27 proceeds to step S111, and resets all the counters used in this routine. Then, the ECU 27 ends the routine.

[Waveform Correlation Coefficient Calculating Routine]

Figure 5:
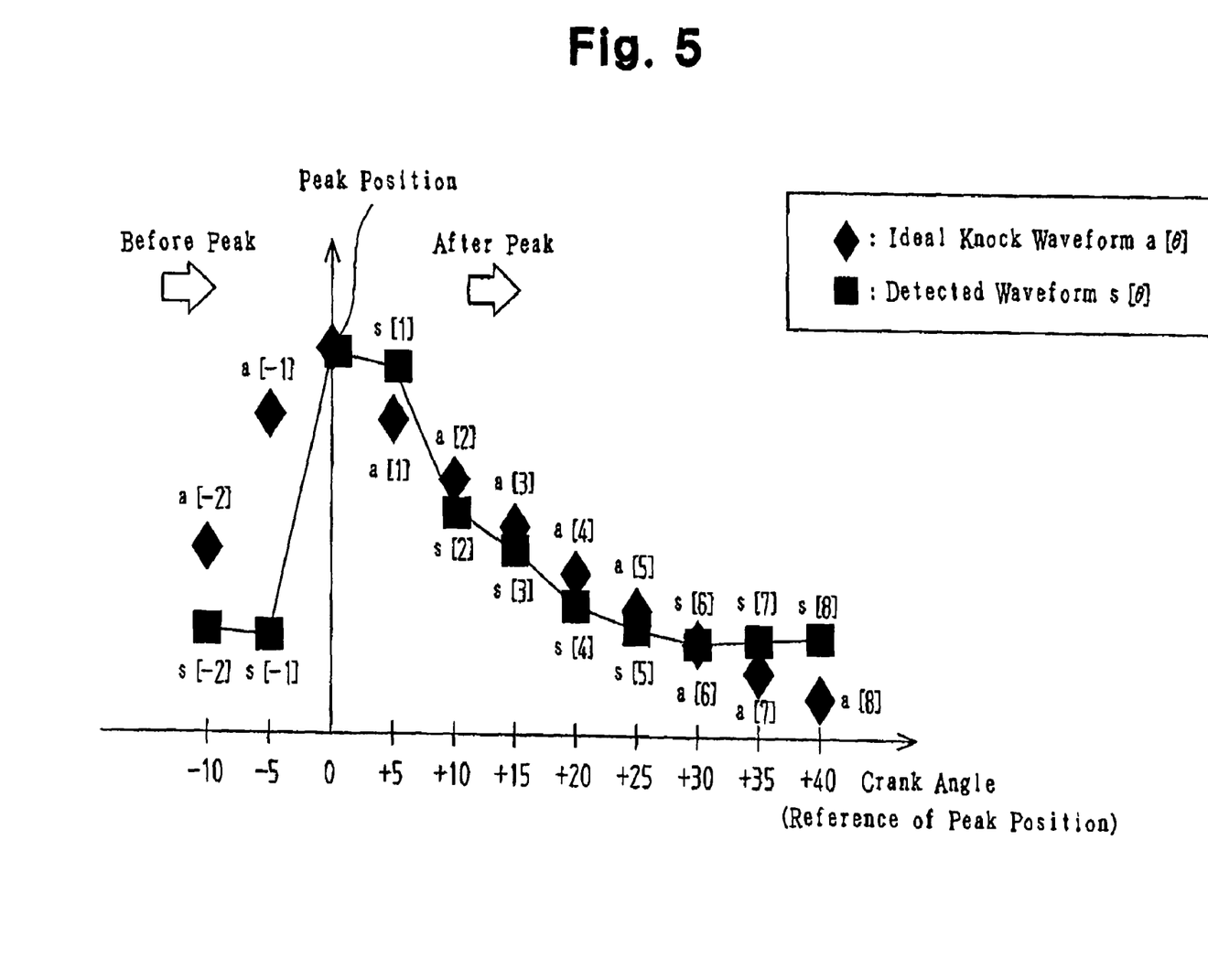
FIG. 5 is a graph showing one example of the detected waveform s[θ] and the ideal knock waveform a[θ]

The waveform correlation coefficient calculating routine of FIG. 3 is a subroutine executed in step S103 of the knock determination threshold value correction routine of FIG. 2. When the routine is started, at step S201, the ECU 27 detects the peak position of the waveform of the detected sensor output (hereinafter, referred to as detected waveform) (see FIG. 5).

Then, at step S202, the ECU 27 compares the detected waveform $s[\theta]$ before the peak with the ideal knock waveform $a[\theta]$, and calculates the waveform correlation coefficient $c[\theta]$ before the peak as follows. That is, the ECU 27 determines whether the detected waveform $s[\theta]$ at the crank angle θ before the peak is less than or equal to the ideal knock waveform $a[\theta]$. If the detected waveform $s[\theta]$ at the crank angle θ before the peak is less than or equal to the ideal knock waveform $a[\theta]$, the ECU 27 sets the waveform correlation coefficient $c[\theta]$ before the peak at the crank angle θ before the peak to "1". If the detected waveform $s[\theta]$ at the crank angle e before the peak is greater than the ideal knock waveform $a[\theta]$, the ECU 27 calculates the waveform correlation coefficient $c[\theta]$ before the peak at the crank angle θ before the peak using the following equation.

$$c[\theta]=1-\{s[\theta]-a[\theta]\}/a[\theta]$$

Figure 6:
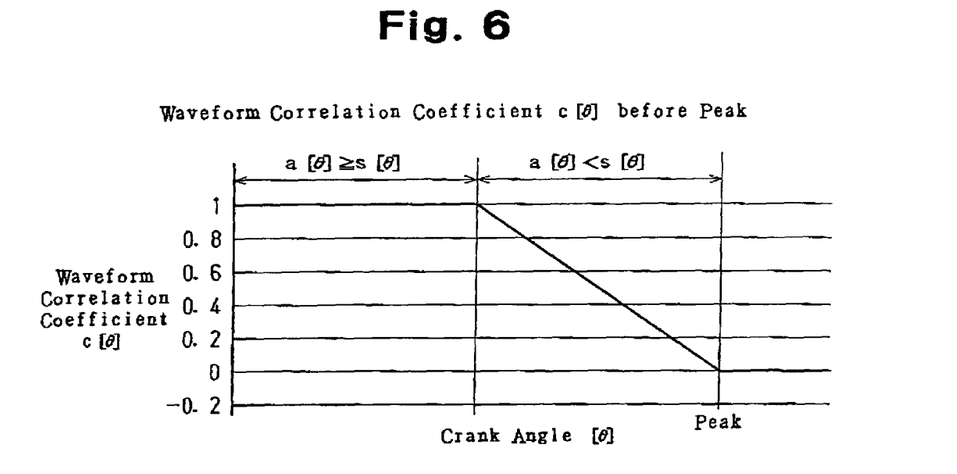
FIG. 6 is a graph showing one example of the waveform correlation coefficient c[θ] before the peak.

In this case, as the deviation $\{s[\theta]-a[\theta]\}$ between the detected waveform $s[\theta]$ and the ideal knock waveform $a[\theta]$ increases, the correlation is reduced, thereby reducing the waveform correlation coefficient $c[\theta]$ before the peak. FIG. 6 shows a calculation example of the waveform correlation coefficient $c[\theta]$ before the peak.

At step S203, the ECU 27 uses the detected waveform $s[\theta]$ after the peak and the ideal knock waveform $a[\theta]$ to calculate the waveform correlation coefficient $c[\theta]$ after the peak at the crank angle θ after the peak by the following equation.

$$c[\theta]=1-|s[\theta]-a[\theta]|/a[\theta]$$

In this case also, as the absolute value $|s[\theta]-a[\theta]|$ of the deviation between the detected waveform $s[\theta]$ and the ideal knock waveform $a[\theta]$ increases, the correlation is reduced.

Figure 7:
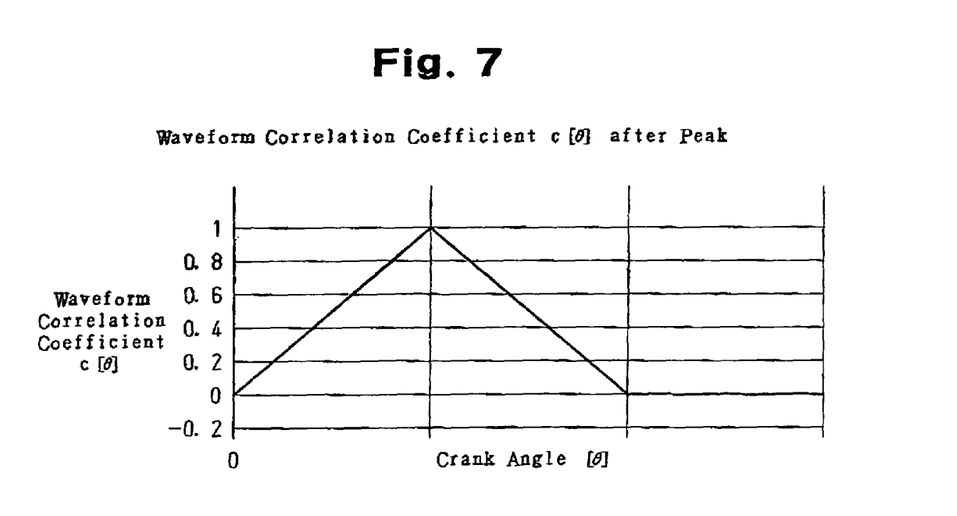
FIG. 7 is a graph showing one example of the waveform correlation coefficient c[θ] after the peak.

Therefore, the waveform correlation coefficient c[θ] after the peak is decreased. FIG. 7 shows a calculation example of the waveform correlation coefficient c[θ] after the peak.

After repeating the process for calculating the waveform correlation coefficient c[θ] for all the crank angle θ during a predetermined period from before the peak to after the peak in the above described manner, the ECU 27 proceeds to step S204, and calculates the final waveform correlation coefficient C by the following equation.

$$C = \Sigma c[\theta] \times a[\theta] / \Sigma a[\theta]$$

According to the above equation, the waveform correlation coefficient C always becomes less than or equal to one ($0 \leq C \leq 1$), and as the correlation between the detected waveform s[θ] and the ideal knock waveform a[θ] is increased, the waveform correlation coefficient C approaches a value close to one.

[Normalization Routine]

The normalization routine of FIG. 4 is a subroutine executed in step S104 of the knock determination threshold value correction routine of FIG. 2. The ECU 27, which executes the normalization routine of FIG. 4, serves as statistical processing means (statistical processing section) and normalization means (normalization section). When the routine is started, at step S301, the ECU 27 reads the previously calculated mean Pav(i−1) of the peak value P and the previously calculated mean Cav(i−1) of the waveform correlation coefficient C, which are stored in the RAM of the ECU 27.

Thereafter, the ECU 27 proceeds to step S302, and calculates the current mean Pav(i) of the peak value P using the following equation of the smoothing process.

$$Pav(i) = \alpha 1 \times P + (1-\alpha 1) \times Pav(i-1)$$

In the above equation, α1 represents a coefficient of smoothing.

Likewise, the ECU 27 calculates the current mean Cav(i) of the waveform correlation coefficient C using the following equation of the smoothing process.

$$Cav(i) = \alpha 2 \times C + (1-\alpha 2) \times Cav(i-1)$$

In the above equation, α2 represents a coefficient of smoothing. In this case also, the smoothing coefficients α1, α2 may be fixed values to simplify the computation process. Alternatively, the smoothing coefficients α1, α2 may be changed in accordance with the engine operating state using a map, a mathematical expression, or the like. If this is the case, for example, during a normal operation of the engine, a setting that stresses the accuracy of the means Pav(i), Cav(i) is selected, and when the operating state of the engine is in a transient state, a setting that stresses the trackability is selected. That is, the accuracy and the trackability are adjusted in accordance with the engine operating state.

Thereafter, the ECU 27 proceeds to step S303, and reads the previously calculated variance Vp(i−1) of the peak value P and the variance Vc(i−1) of the waveform correlation coefficient C, which are stored in the RAM of the ECU 27.

Thereafter, the ECU 27 proceeds to step S304, and calculates the current variance Vp(i) of the peak value P using the following equation of the smoothing process.

$$vp(i) = \beta 1 \times \{P-Pav(i)\}^2 + (1-\beta 1) \times Vp(i-1)$$

In the above equation, β1 represents a coefficient of smoothing.

Likewise, the ECU 27 calculates the current variance Vc(i) of the waveform correlation coefficient C using the following equation of the smoothing process.

$$Vc(i) = \beta 2 \times \{C-Cav(i)\}^2 + (1-\beta 2) \times Vc(i-1)$$

In the above equation, β2 represents a coefficient of smoothing. In this case also, the smoothing coefficients β1, β2 may be fixed values to simplify the computation process. Alternatively, the smoothing coefficients β1, β2 may be changed in accordance with the engine operating state using a map, a mathematical expression, or the like. If this is the case, for example, during a normal operation of the engine, a setting that stresses the accuracy of the variances Vp, Vc is selected, and when the operating state of the engine is in a transient state, a setting that stresses the trackability is selected. That is, the accuracy and the trackability are adjusted in accordance with the engine operating state.

Thereafter, the ECU 27 proceeds to step S305, and computes the square root of the variance Vp(i) of the peak value P to obtain the standard deviation σp of the peak value P. The ECU 27 also computes the square root of the variance Vc(i) of the waveform correlation coefficient C to obtain the standard deviation σc of the waveform correlation coefficient C (see the following equations).

$$\sigma p = \sqrt{Vp(i)}$$

$$\sigma c = \sqrt{Vc(i)}$$

Thereafter, the ECU 27 proceeds to step S306, and calculates the normalized data value Sp of the peak value P and the normalized data value Sc of the waveform correlation coefficient C by the following equations.

$$Sp = \{P-Pav(i)\}/\sigma p$$

$$Sc = \{C-Cav(i)\}/\sigma c$$

Thereafter, the ECU 27 proceeds to step S307, and stores the current means Pav(i), Cav(i) and the current distributions Vp(i), Vc(i) as the previous values Pav(i−1), Cav(i−1), Vp(i−1), and Vc(i−1) in the RAM to prepare for the next computation of normalization. Then, the ECU 27 ends this routine.

In the above mentioned embodiment, the ECU 27 extracts two data values (the peak value and the waveform correlation coefficient) that show the characteristics of a knock from the output of the knock sensor 28 at every ignition. The ECU 27 then approximately obtains the mean of each data value by smoothing each data value. Then, the ECU 27 approximately obtains the variance v by smoothing the squared deviation between each of the data values before the smoothing process and the data value after the smoothing process. The ECU 27 then computes the square root of the variance V to approximately obtain the standard deviation σ. Therefore, the mean and the standard deviation σ are sequentially updated at every sampling of data values. As a result, it is not necessary to keep storing a lot of data values in the RAM of the ECU 27. Thus, the ECU 27 approximately computes the mean and the standard deviation σ with a small RAM capacity. Furthermore, since the top cumulative percentage point is not used, the ECU 27 computes the mean and the standard deviation σ without being influenced by the top variation of the distribution. This improves the approximate accuracy of the mean and the standard deviation σ. Furthermore, using the smoothing process improves the trackability in a transient state.

Furthermore, in this embodiment, since the data values are normalized (equated, made dimensionless) using the mean and the standard deviation σ, even if the operating condition of the engine is changed, the data values sampled before and after the change are corrected to data values sampled under a standard engine operating condition. Therefore, it is no longer necessary to statistically process the data values for each engine operating condition. This reduces the load of the statistical processing and prevents deterioration of the statistical processing accuracy due to changes of the engine operating condition.

Also, in this embodiment, the ECU 27 obtains two data values (the peak value and the waveform correlation coefficient) showing the characteristics of a knock from the output of the knock sensor 28. The ECU 27 then normalizes the two data values, and obtains the distribution of the normalized two data values corresponding to the predetermined number of times of ignition. Therefore, unlike the distribution of only the peak value of the sensor output as that created in the Publication No. 6-60621, the ECU 27 creates a distribution that distinguishes noise from a knock. Therefore, the problem of deterioration of knock determination accuracy due to noise is solved, thereby improving the accuracy and the reliability of knock determination.

Furthermore, in this embodiment, the correlation coefficient for the knock determination representing the correlation (similarity) between the detection distribution and the ideal knock distribution is calculated as the index of the knock level. Based on the correlation coefficient for knock determination (knock level), the knock determination threshold value used for knock determination at every single combustion is corrected. Therefore, even if a mechanical or electrical noise overlaps the sensor output, the knock determination threshold value is accurately corrected. This prevents decrease of the knock determination accuracy due to noise. Furthermore, the knock determination threshold value is automatically corrected in accordance with the production variation of the engine and changes of vibration level with time. Therefore, high precision knock determination is performed always using the appropriate knock determination threshold value. In addition, a design and development engineer need not to closely consider the influence of the production variation of the engine and deterioration with time when adapting the knock determination threshold value to the engine. This simplifies a process for adapting the knock determination threshold value to the engine.

In this embodiment, the knock sensor 28, which detects the vibration of the cylinder block, is used as a sensor that outputs a signal having a waveform that corresponds to the knock state. However, a combustion pressure sensor, which detects the combustion pressure, may be used.

Also, the scope of application of the present invention is not limited to knock determination. In a system in which the output of a sensor that detects the engine operating state is periodically sampled and statistically processed, the present invention may be applied to various controls that require computing the mean, the standard deviation $\sigma$, and the like.

The invention claimed is:

1. A control apparatus for an internal combustion engine, comprising:
    a sensor, which outputs a signal corresponding to the operating state of the internal combustion engine; and
    an engine control unit, wherein the engine control unit:
        obtains data value that shows the engine operating state by periodically sampling the signal; approximately obtains the mean of the data value by smoothing the data value; computes an index representing the degree of spread of the data value using the squared deviation between the data value before the smoothing process and the data value after the smoothing process; and controls the operation of the engine using the mean and the index.

2. The control apparatus for an internal combustion engine, comprising a statistical processing section, which periodically samples and statistically processes the output of a sensor that detects the operating state of the internal combustion engine, wherein the control apparatus controls the operation of the internal combustion engine using the processed result of the statistical processing section, wherein the statistical processing section includes:
    a computing section for smoothing the sampled data value to approximately obtain the mean of the data value every time the output of the sensor is sampled; and
    a computing section for computing an index representing the degree of spread of the data value using the squared deviation between the data value before the smoothing process and the data value after the smoothing process.

3. The control apparatus according to claim 2, wherein the index representing the degree of spread of the data value is a standard deviation $\sigma$, and the statistical processing section approximately obtains a variance V by smoothing the squared deviation between the data value before the smoothing process and the data value after the smoothing process, and computes the square root of the variance V, thereby approximately obtaining the standard deviation $\sigma$.

4. The control apparatus according to claim 3, wherein the statistical processing section includes a normalization section, which normalizes the sampled data value, using the mean and the standard deviation $\sigma$.

5. The control apparatus according to claim 4, wherein the sensor outputs a signal that has a waveform corresponding to the knock state of the internal combustion engine,
    wherein the data value is one of at least two data values obtained every time an output signal of the sensor is sampled, the data values including a peak value of the knock frequency component in the output signal and a waveform correlation coefficient representing the correlation between the waveform of the output signal and an ideal knock waveform, which is the waveform specific to a knock, and
    wherein the statistical processing section: normalizes the peak value and the waveform correlation coefficient by the normalization section; obtains a distribution of the normalized peak value and the normalized waveform correlation coefficient corresponding to a predetermined number of times of ignition; and determines knock occurrence in accordance with whether the profile of the distribution has the characteristics that appear when a knock occurs.

6. The control apparatus according to claim 1, wherein the statistical processing section executes the smoothing process using a predetermined coefficient of smoothing, and the statistical processing section changes the smoothing coefficient in accordance with the operating state of the internal combustion engine.

7. A method for controlling an internal combustion engine, comprising periodically sampling and statistically processing the output of a sensor that detects the operating state of the internal combustion engine, and controlling the operation of the internal combustion engine using the result of the statistical processing, wherein the statistical processing includes:

smoothing the sampled data value to approximately obtain the mean of the data value every time the output of the sensor is sampled; and computing an index representing the degree of spread of the data value using the squared deviation between the data value before the smoothing process and the data value after the smoothing process.

8. The control method according to claim 7, wherein computing an index representing the degree of spread of the data value includes:

smoothing the squared deviation between the data value before the smoothing process and the data value after the smoothing process to approximately obtain a variance V; and computing the square root of the variance V to approximately obtain a standard deviation $\sigma$.

* * * * *